United States Patent [19]
Smith et al.

[11] Patent Number: 4,971,084
[45] Date of Patent: Nov. 20, 1990

[54] VEHICLE WASHING APPARATUS

[75] Inventors: James H. Smith; Jeffrey D. Allen, both of Nashville, Tenn.

[73] Assignee: J. Smith Engineering, Nashville, Tenn.

[21] Appl. No.: 367,504

[22] Filed: Jun. 16, 1989

[51] Int. Cl.$^5$ ............................................. B60S 3/04
[52] U.S. Cl. .................................. 134/045; 134/57 R; 134/123; 134/181; 239/560; 239/565; 239/587
[58] Field of Search ............... 134/57 R, 45, 123, 180, 134/181; 239/556, 560, 565, 587

[56] References Cited

U.S. PATENT DOCUMENTS

| | | | |
|---|---|---|---|
| 3,134,117 | 5/1964 | Frank et al. | 134/123 X |
| 3,391,700 | 7/1968 | Lawter | 134/45 |
| 3,400,727 | 9/1968 | Daum et al. | 134/181 X |
| 3,409,030 | 11/1968 | Schmidt | 134/123 |
| 3,996,948 | 12/1976 | Wiley | 134/45 |

Primary Examiner—Philip R. Coe
Attorney, Agent, or Firm—Harrington A. Lackey

[57] ABSTRACT

A vehicle washing apparatus particularly adapted for the thorough washing of vehicle wheels including a wheel washing device or unit including a pivotally mounted carrousel supporting a rotary spray head and control means for actuating the carrousel to sweep the spray head across and along the wheel as the wheel moves past the washer unit. The carrousel is preferably computer controlled to move in response to the increments of travel of the vehicle so that the washer unit consistently tracks the vehicle wheels regardless of the length of the wheel base or the speed of travel of the vehicle.

17 Claims, 3 Drawing Sheets

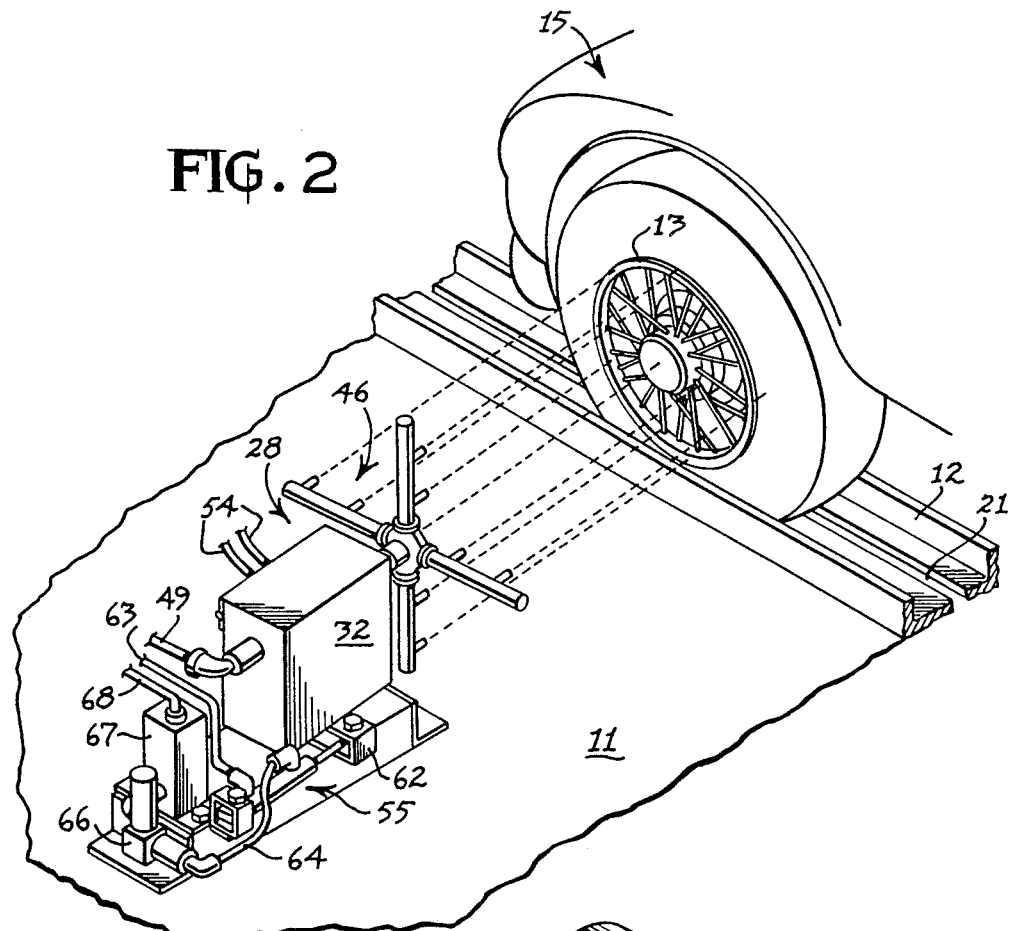
FIG. 2
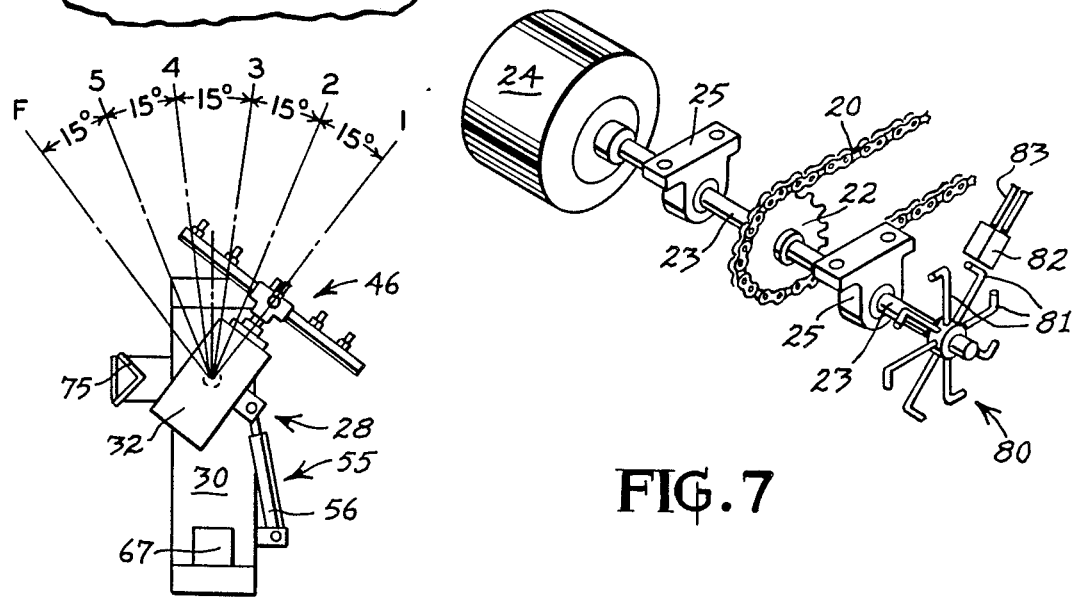
FIG. 6
FIG. 7

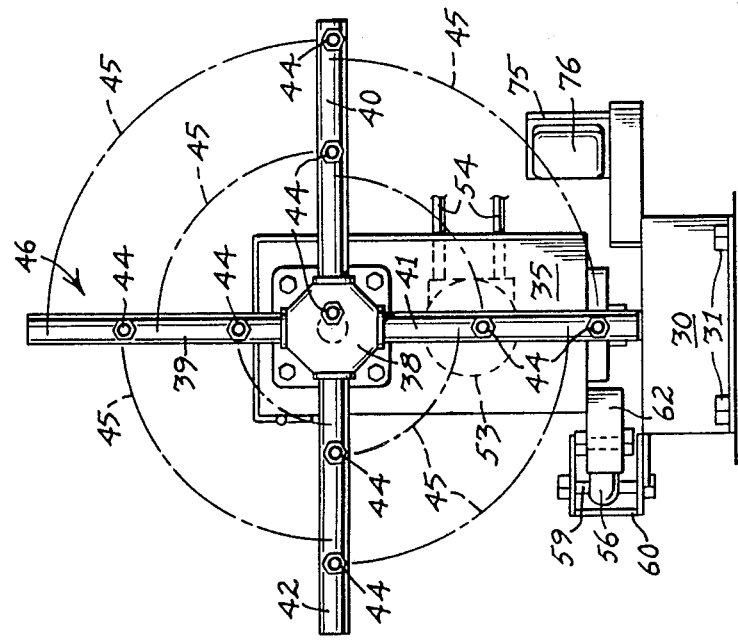
FIG. 4
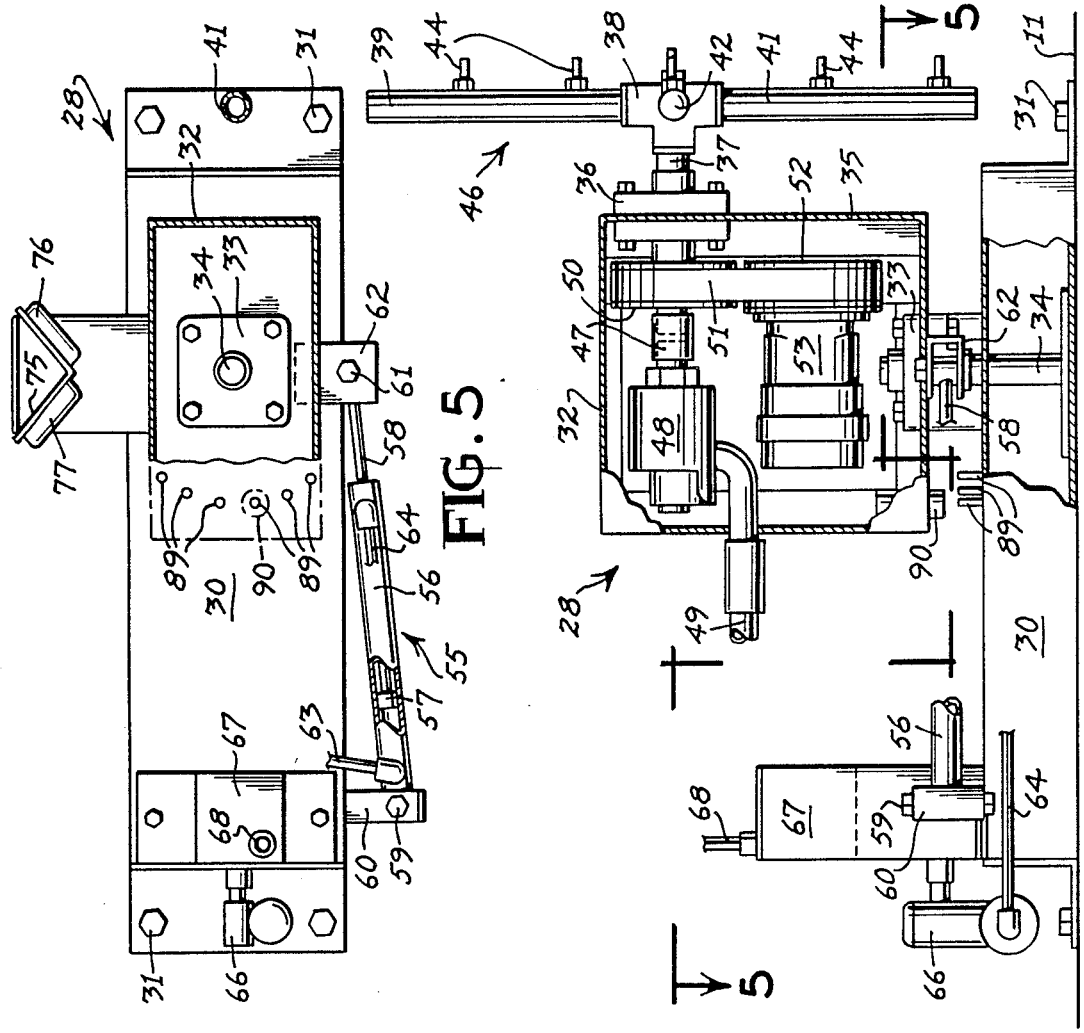
FIG. 5
FIG. 3

VEHICLE WASHING APPARATUS

BACKGROUND OF THE INVENTION

This invention relates to a vehicle washing apparatus, and more particularly to a washing apparatus for consistently tracking the surface of the vehicle to be washed in response to the distance travelled by the vehicle.

In an automatic car wash system, the single most difficult area of the vehicle to clean is the wheel, primarily because of the more intricate designs of the wheel and the changes in surface contours, in contrast to the remaining surfaces of the vehicle. The cleaning of vehicle wheels has always been a problem but the problem has increased in recent years because of the widespread use of aluminum wheel covers and aluminum alloy wheels which require the elimination of many strong alkaline cleaners. Moreover, the current trend of automobile wheel styling is toward wire spokes and very ornate cast alloy wheels, rather than simple wheel covers. For the above reasons, the cleaning of the vehicle wheels is usually not satisfactory, even though the cleaning of the remaining surfaces of the car is adequate.

Heretofore, wheels which have intricate designs have been cleaned manually, but some of the recessed areas are inaccessible to such manual cleaning. Moreover, the cleaning of wheels is compounded by deposits forced on the wheels from front disc brake systems.

Heretofore, the automatic cleaning of wheels in a car wash involves the utilization of stationary wheel sprays and also rotary brushes and wipers of various types which also travel along the sides of the vehicle for washing the sides of the car.

SUMMARY OF THE INVENTION

A vehicle washing apparatus made in accordance with this invention is particularly adapted to thoroughly clean the wheel and wheel wells of a motor vehicle as the vehicle moves through an automatic car wash. The vehicle or wheel washer device is preferably mounted at floor level alongside the vehicle path and includes a rotary spray head supported upon a frame or housing journaled to swing about a vertical axis. The rotary spray head directs high-pressure columns of rotating water streams upon each wheel of the vehicle as the wheel approaches the washer unit. Control means are provided to move the housing and the rotary spray head along with the movement of the wheel so that the high-pressure water streams are constantly directed upon all areas of the wheel during the travel of the vehicle past the washer device. The controls for the washer unit provide for the tracking of the spray head relative to the wheel in response to the distance moved by the vehicle through the car wash, as opposed to control by any type of timer mechanism. By virtue of the relationship between the wheel washer and the distance travelled by the vehicle, each wheel of the vehicle is constantly tracked by the washer, regardless of the speed of movement of the vehicle through the car wash and regardless of the wheel base of the vehicle, that is the distance between the front and the rear walls. Dual washer units are utilized, one on each side of the vehicle, simultaneously washing the front wheels and subsequently the rear wheels of each vehicle.

One object of this invention is to provide a vehicle washing apparatus, and more particularly a wheel washer device incorporating a spray head having a plurality of arms or spokes, each arm including a plurality of spray nozzles or outlets producing a plurality of concentric columns of water by each nozzle as the spray head rapidly rotates. Such rotating column also moves with the wheel in a sweep arc intercepting the wheel.

In a preferred form of the invention, the sweeping rotary spray head is moved through a plurality of discrete angular intervals from the time the vehicle wheel approaches the spray head until it leaves the vicinity of the spray head.

Another object of this invention is to provide a sweeping wheel washer unit including a rotary spray head in which separate controls operate the same wheel washer for washing each of the front and rear wheels independently.

Another object of this invention is to provide a wheel washer unit including a rotary spray head mounted on a pivotal frame or carrousel and a control system for swinging the carrousel and causing a rotary column of liquid from the spray head to sweep the vehicle wheel moving past the unit in response to a count of the distances travelled by the vehicle.

Another object of this invention is to provide a wheel washer device adapted to have a rotary spray head for sweeping the wheel in the vicinity of the spray head and a computer control system for sequencing the operations of the sweeping spray head in synchronism with the movement of the vehicle wheel, regardless of the speed of the movement of the vehicle and regardless of the wheel base of the vehicle.

A further object of this invention is to provide a wheel washer unit incorporating a rotary spray head mounted on a sweeping carrousel in which the spray head incorporates a plurality of spray outlets or nozzles, each of which is rotating in an independent orbit from any other spray nozzle and in which the carrousel moves in interrupted angular increments, to produce a spray pattern which not only constantly impinges upon the wheel as it moves past the washer unit, but also varies the force of the streams upon various surfaces of the wheel at different times.

It is another object of this invention to provide a wheel washer unit which is preferably adapted to direct its rotating and continuously engaging columns of water upon the wheel for one full revolution of the wheel.

BRIEF DESCRIPTION OF THE DRAWINGS

FIG. 2 is top, side perspective view of the left wheel washer unit made in accordance with this invention in an operative position for washing a left vehicle wheel in an automatic car wash;

FIG. 3 is a side elevational view of the wheel washer unit disclosed in FIG. 2, with portions broken away;

FIG. 4 is a right end view of the unit disclosed in FIG. 3, illustrating the orbits of the spray outlets;

FIG. 5 is a plan sectional view taken along the line 5—5 of FIG. 3;

FIG. 6 is a schematic top plan view of the washer unit disclosed in FIG. 2, illustrating the preferred angular interval positions of the spray head;

FIG. 7 is a fragmentary schematic perspective view of the clock switch device mounted on the conveyor sprocket shaft.

DESCRIPTION OF THE PREFERRED EMBODIMENTS

Figure 1:
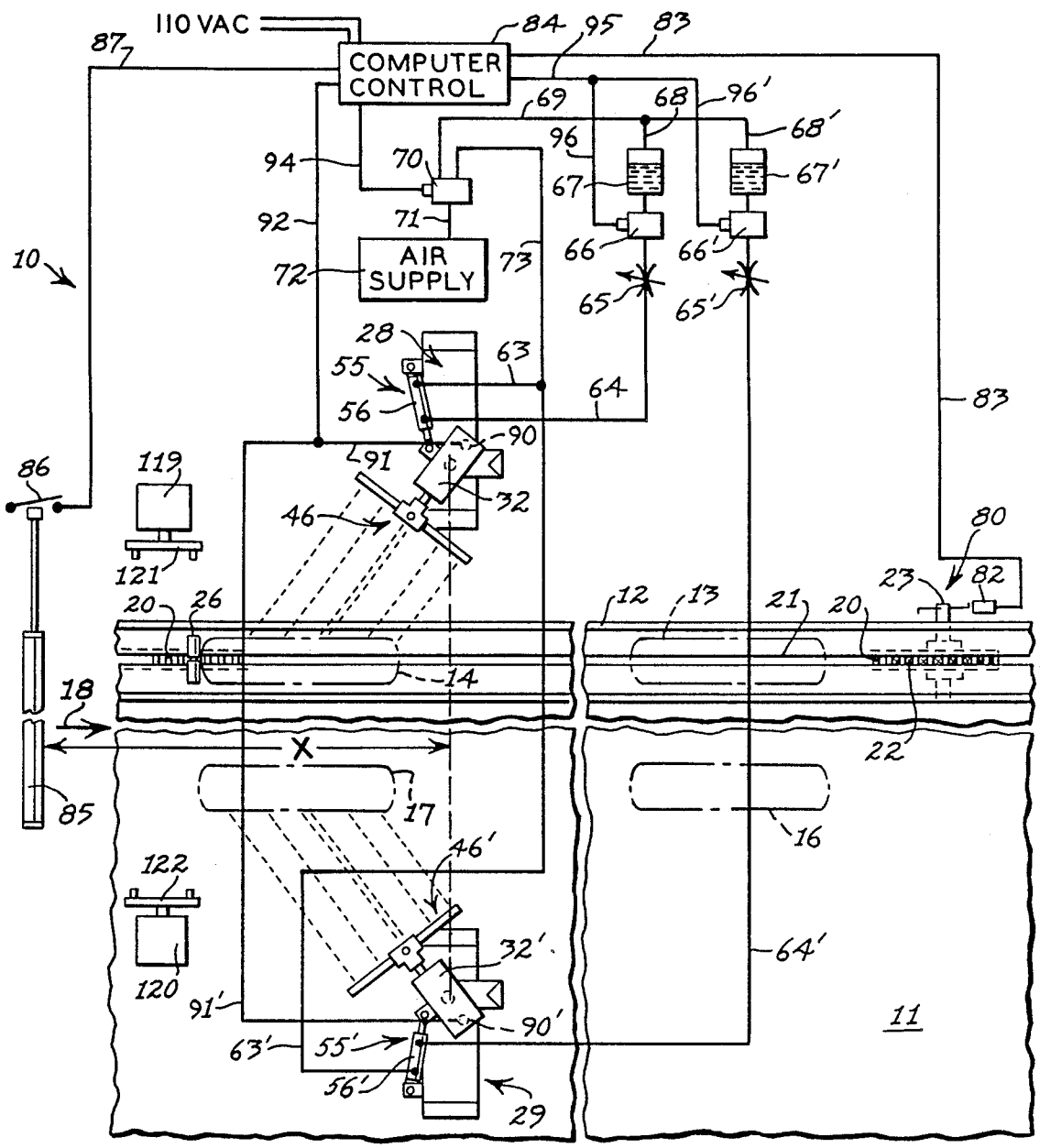
FIG. 1 is a fragmentary top plan schematic view of the vehicle washing apparatus and control system made in accordance with this invention.

Referring now to the drawings in more detail, FIG. 1 discloses schematically a vehicle washing apparatus 10 made in accordance with this invention, installed in a conventional car wash in which the car wash floor 11 is disclosed. The car wash floor 11 includes a conventional wheel track 12, preferably of inverted U-shaped or channel cross-section, as illustrated in FIGS. 1 and 2. As disclosed in the drawings, the wheel track or guide 12 is located to guide the left wheels 13 and 14 of a motor vehicle, such as an automobile 15, having a right front wheel 16 and a right rear wheel 17. As disclosed in FIG. 1, the vehicle or automobile 15 moves over the car wash floor 11 from the left to right of FIG. 1, as illustrated by the vehicle path direction arrow 18.

The means for moving the automobile 15 in the direction of the arrow 18 is an elongated endless conveyor chain 20 adapted to be installed in a recess below the floor 11 and to travel in the elongated groove 21 in the bottom of the track 12. As disclosed in FIG. 1, the front end of the conveyor chain 20 is trained about a head sprocket 22 fixed to a sprocket shaft 23 driven by a motor 24, as illustrated in FIG. 7. The shaft 23 is journaled in bearings 25 fixedly mounted to the floor 11 in any convenient manner, not shown.

Fixed to and projecting up from the upper run of the conveyor chain 22 are transverse pusher rollers riding along the bottom wall of the channel-shaped track 12, such as pusher roller 26 illustrated in FIG. 1. The pusher rollers 26 are mounted at longitudinally spaced intervals for engaging the rear of a wheel, such as wheel 14 (FIG. 1), for pushing the wheel along the track 12 and consequently moving the motor vehicle 15 in the vehicle path 18.

Located transversely on opposite sides of the track 12 and also on opposite sides of the vehicle 15 which moves along the vehicle path 18, are a pair of wheel washer devices or units 28 and 29 of substantially identical construction, and made in accordance with this invention, but which are essentially mirror images of each other.

The wheel washer device 28 includes a rectangular base 30 fixedly mounted to the floor 11 on the left-hand side of the track 12 by means such as bolts 31 (FIGS. 3-5), preferably so that its longitudinal axis is disposed transversely of the vehicle path or track 12. Pivotally mounted on top of the base 30 is a washer frame, housing, or carrousel 32. The housing 32 is swivelly mounted by a journal bearing 33 upon a vertical pivot post 34 projecting upright from the base 30.

Rotatably mounted through the front or operative end portion or wall 35 of the housing 32 in a journal bearing 36, is an elongated hollow shaft 37. The hollow shaft 37 is adapted to convey liquid, such as water, through its hollow core from one end to the other. The outlet end of the hollow shaft 37 is connected to a hollow hub 38 having radially disposed fluid openings to each of which is connected a radially projecting hollow spray arm, such as the four spray arms 39, 40, 41, and 42 disclosed in FIG. 4.

Formed in each of the arms 39-42 is a plurality of outlet ports or spray nozzles, all directed forward or inboard substantially parallel to each other. As illustrated in FIG. 4, each of the spray outlets or nozzles 44 lies at a radial spacing or distance from the axis of the rotary shaft 37 different from the radial distance of any other spray outlet. In this manner, each spray outlet 44 will discharge a spray of liquid or water in a circular orbit, such as 45, which has a different radius from any other circular orbit 45. As illustrated in FIG. 4, there are two spray outlets or nozzles 44 located on each of the spray arms 39-42.

It will be understood that more or less radial arms 39-42 may be employed, and there may be more or fewer spray nozzles 44, if desired.

All of the spray arms 39-42 are in fluid communication with the hollow hub 38, which in turn is in fluid communication with the outlet end of the hollow shaft 37. The spray arms 39-42 including the hub 38 and the spray outlets 44 constitute the rotary spray head 46 mounted on the washer housing or carrousel 32.

The inlet end portion of the hollow rotary shaft 37 is coupled for rotary movement, such as in a slip coupling 47 to a "Monoflow" which in turn is connected to a water inlet supply pipe 49.

Fixed upon the rotary shaft 37 is an upper or driven pulley 50 carrying a transmission belt 51 trained about a lower drive pulley 52 driven ,y a motor, such as the hydraulic motor 53. The hydraulic motor 53 is supplied through the hydraulic supply lines or hoses 54 from a source of hydraulic fluid, not shown. The hydraulic motor 53 is mounted within the carrousel or housing 32, as best disclosed in FIGS. 3 and 4.

In order to pivot or swing the carrousel 32 relative to the base 30, a reciprocable linear motor 55 is connected between the housing 32 and the base 30. The linear motor 55 may include a fluid cylinder 56 reciprocably and coaxially carrying a piston 57 and piston rod 58 (FIG. 5). The rear or outboard end of the cylinder 56 is connected by pivot pin 59 to bracket 60 fixed to the base 30, while the inboard or forward end portion of the piston rod 58 is journaled by a pin 61 to a bracket 62 fixed to the carrousel 32. Coupled in fluid communication to the rear or outboard end portion of the cylinder 56 is a flexible branch air supply hose or line 63 which supplies air behind the piston 57. Coupled in fluid communication with the front or inboard end portion of the cylinder 56 in front of the piston 57 is a liquid or hydraulic hose or line 64.

The hydraulic line 64 may be connected through a variable flow control valve 65 (FIG. 1) and a solenoid lock valve 66 to the lower end of an air-oil reservoir 67. The upper end of the reservoir 67 is connected through a branch air supply line 68 to an air supply line 69 (FIG. 1), which in turn is connected through a pivot control solenoid valve 70. The solenoid valve 70 is connected through an air supply line 71 to a source of compressed air 72. The solenoid valve 70 is also connected to the air cylinder supply line 73, to which the branch air line 63 is connected.

The pivot control valve 70 is a solenoid-type reversing or spool valve to permit air from the supply line 71 to pass either through the reservoir supply line 69 or the cylinder supply line 73, depending upon the mode of the control valve 70. Thus, when the solenoid valve 70 is actuated to a first or sweep mode, air is supplied through the cylinder supply line 73 to the cylinder 56 in order to cause the washer carrousel 32 of unit 28 to sweep in a counter-clockwise direction in FIG. 1 so that the spray head 46 will move with the left vehicle wheel 13 or 14 as the wheel moves from left to right along the track 12.

When the solenoid valve 70 is reversed to its second mode, the cylinder supply line 73 is closed, while the reservoir supply line 69 is opened, and air is supplied to the reservoir 67 in order to force hydraulic fluid out through the open solenoid valve 66, flow control valve 65 and into the opposite end of the cylinder 56 in order to cause the carrousel 32 to reverse its sweep motion and move in a clockwise direction.

The right wheel washer device 29 includes the same parts as the left wheel washer device 28, and like parts bear the same reference numerals which are primed, such as the cylinder 56', the washer housing 32', and the spray head 46'. Air is supplied from the solenoid valve 70 and the cylinder supply line 73 through the branch line 63' to the rear end of the cylinder 56', as disclosed in FIG. 1. Hydraulic fluid is supplied to the cylinder hydraulic supply line 64' through flow control valve 65', solenoid valve 66' and air-oil reservoir 67' in the same manner as the corresponding elements supply hydraulic fluid through the hydraulic line 64 to the cylinder 56.

The cylinders 56 and 56' are operated simultaneously to move the corresponding spray heads 46 and 46' in simultaneous opposite arcuate directions to track and wash the corresponding left and right front wheels 13 and 16 and subsequently the rear wheels 14 and 17. The washing of the rear wheels 14 and 17 is illustrated in the schematic diagram of FIG. 1. Moreover, both spray heads 46 and 46' are pivoted in reverse simultaneously to their initial washing positions when oil is supplied through the corresponding lines 64 and 64' to the cylinders 56 and 56'.

If desired, a stop member 75 having a pair of stop surfaces or pads 76 and 77, as best illustrated in FIG. 5, may be mounted on the base 30 adjacent the washer housing 32 to limit the pivotal motion of the housing 32 in both the sweep and reverse directions.

As best disclosed in FIGS. 1 and 7, a conventional clock switch 80 is mounted on the end of the conveyor shaft 23 to provide a means for counting the revolutions of the shaft 23, and consequently the incremental distances of chain travel. The clock switch 80 includes a plurality of circumferentially spaced, radially extending, counter teeth 81 mounted on the sprocket shaft 23 which travel past a stationary sensor 82, such as a conventional proximity sensing switch. The sensor switch 82 is connected through a line 83 to a computer control device 84. The clock switch 80 is designed to transmit an electronic input pulse to the computer control device 84 each time a counter tooth 81 passes by or registers with the sensor switch 82.

Mounted in advance of, or upstream from, the wheel washer devices 28 and 29 is a transverse treadle member 85 adapted to close the treadle switch 86 each time a wheel of the vehicle 15 moves over the treadle member 85. The closed treadle switch 86 sends a signal through the treadle input line 87 to the computer control device 84 to initiate the actuation of the clock switch 80.

Mounted on the top face of the base 30 in an arcuate pattern are a plurality of equally spaced pivot position bolts or posts 89, as best illustrated in FIGS. 3 and 5. As illustrated in FIG. 3, the bolts 89 project upwardly from the top surface of the base 30 and at substantially equal elevations. As illustrated in FIG. 5, there are six position bolts 89 disclosed to represent six different positions of the carrousel or washer housing 32, as shown in FIG. 6. Also as shown in FIG. 6, the angular interval between each adjacent pair of positions is illustrated as being 15 deg.

Mounted in the bottom, wall of the housing 32 and projecting downward is a position sensor in the form of a proximity switch 90 which has the same radial spacing from the axis of the vertical pivot post 34 as do the pivot position bolts or posts 89. Thus, as the housing 32 swings about its pivotal axis, the sensor 90 moves in an arcuate path in vertical alignment with the circular pattern of the position bolts 89. The position sensor 90 is connected through a branch lead 91 to a position input line 92 connected to the computer control device 84. Thus, each time the sensor 90 is directly above, or registers with, a position bolt 89, an input signal is generated to pass through the lines 91 and 92 into the computer control device 84.

In the same manner, the position sensor 90' is provided in the bottom of the washer housing 32' of the wheel washer device 29, and is also provided with the same structure and arrangement of pivot position bolts as the bolts 89 to transmit position input signals through a branch line 91' to the input line 92 and the computer control device 84.

The computer control device 84 is also connected through an output line 94 to the solenoid-actuated reversing valve 70 in order to reverse the valve 70 between its two operating modes. Furthermore, the computer control device 84 is connected through an output lock line 95 and branch lines 96 and 96' to the solenoid-actuated lock valves 66 and 66'. Thus, when the computer control device 84 actuates the solenoid valves 66 and 66', the valves 66 and 66' will immediately close the hydraulic lines 64 and 64' to immediately stop any further sweeping motion of the cylinders 66 and 56' and the carrousels 32 and 32'.

The computer control device 84 is also connected to a lead 97 (FIG. 8) for energizing the hydraulic controls for the hydraulic motors 53 in both of the washer devices 28 and 29 Also, a lead 98 from the hydraulic control device 84 may be connected to the valves, or valve controls, not shown, for opening the water supply to the input water hoses 49 for both washer devices 28 and 29.

The computer control device 84 may be of any desired computer hardware capable of responding to the various signals provided to the computer control device 84 through the input lines 87, 83, and 92, in order to carry out the desired functions of the car wash and wheel washer device.

Figure 8:
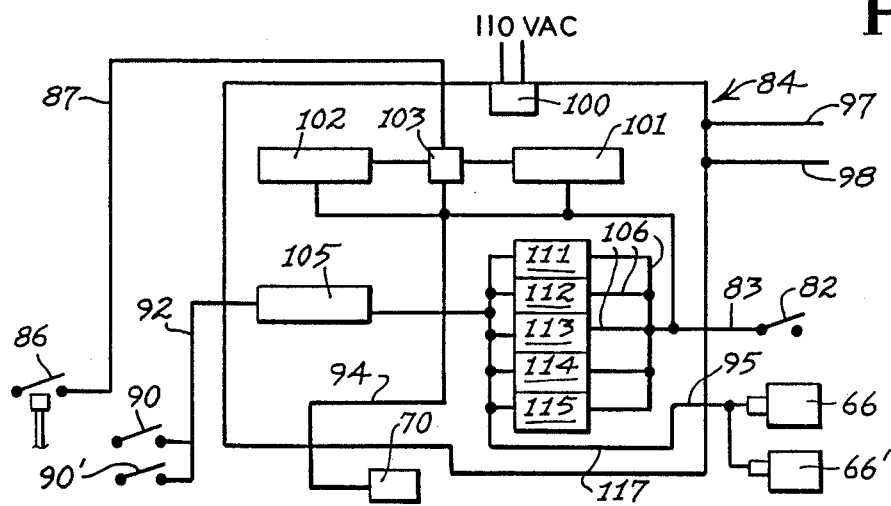
FIG. 8 is an enlarged schematic electronic block diagram of the computer control unit disclosed in FIG. 1, including the counters.

In one example of the apparatus 10, the computer device 84 is a General Electric Programmable Controller, Series One Junior, and specifically the GE FANUC 1C609SJR120C. As illustrated in FIG. 8, this computer control device 84 includes various electronic elements and circuitry, some of which are a 110 volt AC power supply circuit 100, a front wheel counter 101, a rear wheel counter 102, both of which are connected to an alternate wheel counter 103, which in turn is connected to the treadle input signal line 87. The computer control device 84 also includes a position counter 105 are connected to the position input line 92.

The front wheel counter 101, the rear wheel counter 102, and the alternate wheel counter 103 are also all connected to the clock switch input line 83. The clock input line 83 is also connected through branch lines 106 in parallel to position interval counters 111, 112, 113, 114, and 115, each of which is in electrical communication with the lock valves 66 and 66' through lead 117.

In the preferred operation of the apparatus 10, a pair of wheel cleaning units 119 and 120 having rotary spray heads 121 and 122 are located between the treadle member 85 and the washer units 28 and 29. The function of the cleaning units 119 and 120 is to spray rotary columns of a chemical cleansing agent upon the wheels of the vehicle before they are power-sprayed with water by the washer units 28 and 29. Thus, in a preferred form of the invention, the wheel washer units 28 and 29 are designed to power-spray columns of plain water upon the wheels in order to perform the dual functions of rinsing the wheels and also to scour the wheels with pressurized streams of water.

In the operation of the apparatus 10, all of the electrical, air, water, and hydraulic elements are normally initially at rest. Initially, the washer units 28 and 29 are disposed in the positions disclosed in FIG. 1, with each of the housings 32 and 32' in their initial position No. 1 with the spray head facing the oncoming vehicles, as illustrated in FIGS. 1 and 6. Moreover, before the system is actuated, the wheel conveyor chain 22 is moving by virtue of the energization of the conveyor motor 24 (FIG. 7), in order to move a vehicle 15, whose left wheels are in the track 12, forward in the direction of the arrow 18.

As the front wheels 13 and 16 approach the treadle member 85, either or both wheels roll over the treadle member 85 in order to close the treadle switch 86 and send an initial input signal through the line 87 into the preprogrammed computer control device 84. This input signal from the treadle switch 86 actuates the control device 84 to energize the clock switch sensor 82 with instructions to start counting the rotating counter teeth 81. The longitudinal distance X between the treadle member 85 and the centerline of the washer devices 28 and 29 (FIG. 1), is programmed into the computer device 84. After the front wheel counter 101 counts the number of input pulses from the clock switch sensor 82 equivalent to a distance which will place the wheel in a position for initially receiving the spray from the corresponding spray head 46, the position counter 105 commences counting the first position bolt or post 89, and the position interval counter 111 begins counting a predetermined number of clock pulses, such as 3, during a dwell interval while the carrousel is in position 1. At the end of the first dwell interval, the reversing valve 70 is energized to the first or sweep mode to open air line 73 and actuate the linear motors 55 and 55' to move the carrousels 32 and 32' causing the spray heads 46 and 46' to track the front wheels 13 and 16 through a first sweep interval of approximately 15 deg.

When the treadle switch 86 is closed, the computer control device 84 is preferably programmed to send signals through the lines 97 and 98 to the hydraulic motor 53 to rotate each spray head 46. The computer control device 84 may also be programmed to simultaneously turn on the water to discharge water under pressure through the inlet line 49 and through the hollow shaft 37 and spray head 46 to produce water streams under high pressure, such as approximately 700–750 p.s.i., at the rate of approximately 20 gallons per minute into as many rotary orbital paths 45 as there are nozzles 44. Such a discharge will create a column of concentric water curtains or streams forced directly at the front wheels 13 and 16. The control device 84 is programmed to energize the air valve 70 to discharge air through the line 73 just as the front wheels 13 and 16 are leaving the spray column from the spray heads 46 and 46'.

The carrousels 32 and 32' will continue to pivot through the first sweep interval to cause their corresponding spray columns to move across the respective wheels until the columns are directed slightly in front of the wheels 13 and 16. At this point, which is position 2 in FIG. 6, the position sensor 90 registers with the second position post 89 transmitting a signal through input line 92 into the position counter 105, which will count the second position bolt 89. Thus, when the carrousel 32 arrives at position 2, the counter 105 will count one pulse or one count. Moreover, simultaneously a signal is sent to the solenoid lock valves 66 and 66' in order to is immediately lock the hydraulic fluid in the lines 64 and 64' to immediately stop the movement of the piston 57 within each corresponding cylinder 56 and 56' and to immediately lock the carrousels 32 and 32' precisely in position No. 2.

At the same time, the second position interval counter 112 is energized to start counting while the washer frame or housing 32 is in position 2. The counter 112 may count any desired number of clock pulses from the clock sensor 80, such as another three clock pulses, at the end of which time, signals are produced and transmitted to the computer control device 84 to open the lock valves 66 and 66' and to permit the pressurized air in the lines 63 and 63' to continue forcing the piston and piston rod in the sweep direction toward the next position No. 3.

After the carrousel reaches position No. 3, the process for step No. 2 is repeated, that is a signal is transmitted from the sensors 90 and 90' to the position counter 105, which counts the next bolt at position No. 3 and then activates the position interval counter 113 to begin counting another three pulses and also to close the solenoid lock valve 66 and 66' to stop the carrousels in position No. 3.

The above procedure is continued for positions 4 and 5, and the counters 114 and 115 are successively actuated to each count their three pulses and simultaneously close the lock valves and subsequently to re-open the lock valves to permit the carrousels 32 and 32' to continue their sweep intervals.

After the carrousels 32 and 32' have reached the sixth or final position F, the sensor 90 registers with the last position bolt 89, a signal is sent through the line 94 to the reversing valve 70 in order to reverse the position of valve 70 from mode 1 to mode 2, closing the line 73 and opening the air line 69 to the air-oil reservoirs 67 and 67'. Since both solenoid lock valves 66 and 66' are open, oil is forced from the reservoirs 67 and 67' by the compressed air in the lines 69 to the opposite ends of the linear actuator cylinders 56 and 56' in order to reverse the sweeping movement of the carrousels 32 and 32' and cause the carrousels to travel continuously back to their original positions 1.

After the return sweep of the carrousels, the alternate wheel counter 103 is energized to count a number of pulses, such as two pulses, in order to de-actuate the front wheel counter 101 and to actuate the rear wheel counter 102 so that the rear wheel counter 102 is now receptive to the input signals from the treadle line 87. Now the rear wheel counter 102 commences counting the clock pulses from the clock switch 80. However, the rear wheel counter 102 will not commence counting until the rear wheels 14 and 17 cross the treadle member 85 and actuate the treadle switch 86. Because of the different wheel counters 101 and 102, the front wheels 13 and 16, and subsequently the rear wheels 14 and 17, will always be in their proper positions for washing relative to the washer units 28 and 29, regardless of the wheel base of the vehicle 15, that is the longitudinal spacing between the front wheels and the rear wheels. As a matter of fact, in the event of a vehicle 15 having a relatively short wheel base, the rear wheel counter 102 can start counting while the front wheel counter 101 is in the process of counting.

After the rear wheel counter 102 completes its counting cycle, and the carrousels 32 and 32' have been restored to position 1, the alternate wheel counter 103 shifts the modes of the rear wheel counter 102 and the front wheel counter 101 so that the front wheel counter 101 will be in a position to commence the operation of the wheel washer units 28 and 29 when the front wheels of the next vehicle in the car wash engage the treadle member 85.

The rotary spray nozzles 46 and 46' are preferably driven at a speed of approximately 100 rpm by the hydraulic motors 53. By causing the spray heads 46 and 46' to move in interrupted intervals, such as the angular intervals of 15 deg., the spray heads are permitted to direct their spray columns upon some portion of the wheel at all times while the wheel is moving across the spray head and the spray head is moving through its entire sweep cycle from position 1 to position F. The interrupted angular intervals of the spray columns permit the continuously moving wheel to be periodically swept with large columns of rapidly rotating forced streams of water. The interrupted columns are held temporarily in a position to permit the wheel to pass through the spray, and then for each subsequent interval, the process is repeated. Simultaneously, each spray head 46 is rapidly rotating so that the rotating streams of water from the spray nozzles 44 are continuously sweeping many different areas, repeatedly, in order to thoroughly clean the wheel being sprayed.

Although the 15 deg. intervals might be varied, depending upon the distance of each washer unit 28 and 29 from their respective wheels, nevertheless, for the relative distances disclosed in the drawings, the intervals of 15 deg. permit the washer units 28 and 29 to operate very satisfactorily.

Furthermore, it has been found that the spray apparatus 10 made in accordance with this invention has been very effective in cleaning wheels, and particularly the wire wheels and aluminum alloy wheels, which have been difficult to clean heretofore by conventional wheel washing methods. The wheel washing apparatus 10 made in accordance with this invention has received wide acceptance in the car wash industry.

Since the wheel washer units 28 and 29 operate in response to the distance through which the vehicle travels through the car wash, by virtue of the clock switch 82, the speed with which the conveyor chain 22 travels is immaterial to the successful functioning of the washer units 28 and 29. Thus, where a car wash has a heavy volume of business and is moving cars through the car wash at a higher rate of speed, the wheel washer units 28 and 29 still function in the same manner and track each wheel 13-17 with the same degree of accuracy as if the vehicles were moving more slowly through the car wash.

The computer control device 84 is shown schematically in FIG. 8 to illustrate the different counters of the device which are employed to control the operation of the wheel washer units 28 and 29, and the drawing by no means discloses all of the elements within the control device 84 required to make the computer function in its desired manner. The remaining elements of the computer device 84 are included in the well-known computer hardware previously described, specifically, in the GE PROGRAMMABLE CONTROLLER SERIES I JUNIOR available on the market.

The computer control device 84 has been particularly programmed so that for each sweep of a washer housing 32, each wheel 13-17 will complete one complete revolution before the sweep movement of the spray heads 46 and 46' is reversed and re-set.

It will also be understood that as each spray head 46 and 46' remain in their initial positions with their spray heads rotating until the corresponding vehicle wheels come within the range of the spray columns, that the spray columns will be spraying the front bumpers and other front surfaces of the approaching vehicle. Moreover, as the vehicle is leaving the washing site with the rotary spray heads 46 and 46' in position F, the spray columns will spray the rear surfaces of the vehicle 15 as it leaves the spray heads.

Moreover, an additional position interval counter could be incorporated with the other position interval counters 111-115 in order to hold the spray heads 46 and 46' in their final position F for a predetermined time in order to wash the rear portions of the vehicle after the rear wheels pass. Such a procedure could also be carried out as the front wheels leave the spray heads to permit the spray columns to wash the surfaces of the vehicle immediately behind the front wheel wells.

After the front wheels have been washed and before the rear wheels have been washed, as the carrousels 32 and 32' are counter-rotated from position F to position 1, the, spray heads 46 and 46' sweep the intermediate surfaces of the vehicle on both sides between the front and rear wheels in order to afford additional cleaning to the sides of the bodies of the vehicles.

As disclosed in FIG. 7, there are eight counter teeth 81 mounted on the conveyor shaft 23. Accordingly, eight input pulses will be sensed and introduced into the computer control device 84 for each revolution of the conveyor sprocket 22 In one form of the invention, there is approximately 4 inches of chain travel for each counter tooth 81, and consequently, for each clock switch pulse. Also in one form of the invention, the distance X between the treadle member 85 and the centerline of the opposed washer units 28 and 29 is approximately 10 ft. These distances and clock pulses are programmed into the computer device 84 in order to cause the water columns from the spray heads 46 and 46' to track the corresponding wheels 13-17 at the maximum coverage of the wheels for one revolution of each of the wheels.

What is claimed is:
1. A vehicle wheel washing apparatus comprising:
 (a) an elongated track along which a vehicle wheel is adapted to roll in a longitudinal wheel path as the vehicle moves in a longitudinal vehicle path,
 (b) motive means for moving the vehicle in said longitudinal vehicle path,
 (c) a washer frame,
 (d) means movably mounting said washer frame alongside said track for sweeping movement of said washer frame relative to a vehicle wheel in an adjacent wheel path,

(e) an elongated, hollow shaft having an inlet portion, and outlet end portion, and an elongated rotary axis,
(f) bearing means rotatably mounting said shaft on said washer frame for rotary movement about said rotary axis,
(g) a spray head mounted on said outlet end portion of said shaft for rotary movement with said shaft,
(h) said spray head including a plurality of spray outlets arranged to rotate in a plurality of spray orbits coaxial with said rotary axis, said spray outlets being directed generally toward said wheel path,
(i) liquid supply means for introducing liquid into said inlet portion of said shaft,
(j) drive means for rotating said shaft to produce a rotary spray path of the liquid discharged from said spray outlets,
(k) sweep actuator means for reciprocably moving said washer frame through a sweep path including an initial frame position in which said rotary spray path initially intercepts a wheel in said wheel path, an intermediate frame position and a final frame position in which said rotary spray path intercepts said wheel in said wheel path as said wheel leaves said rotary spray path,
(l) said sweep actuator means further directing said rotary orbital streams of liquid from said spray head in said rotary spray path which continually intercepts portions of said vehicle wheel continuously rolling along said track in said wheel path, while said washer frame is in one of said frame positions,
(m) control means responsive to the position of the vehicle on said track for actuating said sweep actuator means to move said washer frame through said sweep path from said initial frame position to said final frame position while said wheel is continually intercepted by said rotary spray path in all said frame positions.

2. The invention according to claim 1 in which said rotary shaft is disposed for sweeping movement in a horizontal plane at substantially the same elevation as the rolling wheel moving longitudinally in said wheel path.

3. The invention according to claim 1 further comprising means for reversing the actuation of said sweep actuator means to move said washer frame from said final frame position to said initial frame position.

4. The invention according to claim 1 in which the vehicle adapted to be washed by said vehicle washing apparatus includes a front wheel and a rear wheel, said control means being responsive to the position of said front wheel for actuating said sweep actuator means to move said washer frame through said sweep path while said front wheel is continually intercepted by said rotary spray path, and said control means being responsive to the position of said rear wheel independently of the position of said front wheel, for actuating said sweep actuator means to move said washer frame through said sweep path while said rear wheel is continually intercepted by said rotary spray path.

5. The invention according to claim 4 in which said control means further comprises computer control means comprising a front wheel counter and a rear wheel counter, said front wheel counter being adapted to count the incremental lengths of travel of said front wheel rolling on said track in order to establish said initial frame position relative to said front wheel, said rear wheel counter being adapted to count the incremental lengths of travel of said rear wheel, independently of the travel of said front wheel, rolling over said track for establishing said frame positions of said washer frame relative to said rear wheel, and means for alternately actuating said front wheel counter and said rear wheel counter, said sweep actuator means being responsive to said front wheel counter as said front wheel moves past said washer frame, and said sweep actuator means being responsive to said rear wheel counter when said rear wheel rolls past said washer frame.

6. The invention according to claim 5 further comprising treadle switch means mounted in said vehicle path in advance of said washer frame, said motive means for moving the vehicle along said track comprising a conveyor chain operatively associated with the vehicle, a sprocket about which said chain is trained, a sprocket shaft, and means for driving said sprocket shaft, said counting means comprising pulse elements equally circumferentially spaced around said sprocket shaft and clock sensor means adapted to be activated by said pulse elements to produce a pulse signal for each pulse element registering with said clock sensor means, said input signal from said treadle switch and said pulse signals being introduced into said computer control means for controlling the operation of said washer frame.

7. The invention according to claim 6 in which said washer frame is mounted a predetermined distance downstream of said treadle switch means, said computer control means being adapted to actuate said sweep actuator means after said front wheel counter has received a predetermined number of pulse signals from said clock sensor means in order to commence the sweep movement of said washer frame.

8. The invention according to claim 1 in which said means movably mounting said washer frame comprises means pivotally mounting said washer frame about an upright pivotal axis, said sweep actuator means being adapted to reciprocably move said washer frame through said sweep path about said pivotal axis.

9. The invention according to claim 8 in which said sweep actuator means comprises means for moving said washer frame in angular increments between said initial frame position in which said rotary axis is at an angle to said vehicle path and said rotary spray path is directed toward said wheel as said wheel approaches said washer frame, and said final frame position in which said rotary axis is at an angle to said vehicle path and said rotary spray path is directed toward said vehicle wheel as it moves away from said washer frame.

10. The invention according to claim 1 in which said spray head comprises a plurality of hollow spray arms projecting radially from said rotary axis and in fluid communication with said hollow shaft, said spray outlets being formed in each of said spray arms and being spaced from said rotary axis a radial distance different from the radially spaced distance of any other spray outlet, whereby each of said spray outlets generates a circular spray column having a different radius from any circular spray column.

11. The invention according to claim 1 in which said sweep actuator means comprises a fluid-actuated linear motor connected to said washer frame for moving said washer frame, said linear motor including a reciprocable piston.

12. The invention according to claim 11 further comprising reversing valve means for reversing the flow of fluid from one side of said piston to the other, and means sensing said washer frame in said final frame position for actuating said reversing valve means in order to move said washer frame from said final frame position back to said initial frame position.

13. The invention according to claim 12 in which said reversing valve means is a reversing air valve having a valve inlet and first and second outlets and means for alternately placing one of said two outlets in fluid communication with said valve inlet and further comprising an air-liquid reservoir having an air inlet and a liquid outlet, said first outlet being in fluid communication with said linear motor on said one side of said piston, said second outlet being in fluid communication with said air inlet, and said liquid outlet being in communication with said linear motor on said opposite side of said piston.

14. The invention according to claim 13 further comprising a lock valve in fluid communication between said liquid outlet and said linear motor on said opposite side of said piston, and position sensor means operatively connected to said washer frame operatively connected to said lock valve for closing said lock valve at the end of each of said angular increments.

15. The invention according to claim 14 further comprising counter means for automatically opening said lock valve after said lock valve has been closed for a predetermined count relative to the position of the vehicle in said vehicle path.

16. The invention according to claim 11 further comprising deactivator means for deactivating said sweep actuator means, a position sensor on said washer frame electrically connected to said deactivator means, and a plurality of fixed position elements spaced in an arcuate pattern for registry with said position sensor for automatically activating said position sensor when said position sensor registers with a position element at the end of each sweep interval for energizing said deactivator means for stopping the sweep movement of said washer frame.

17. The invention according to claim 16 in which said deactivator means comprises position interval counter means for receiving and counting pulses from said control means to produce an output signal at the termination of a predetermined count for de-energizing said deactivator means and for actuating said sweep actuator means to move said washer frame through its next interval.

* * * * *